(12) United States Patent
Powell et al.

(10) Patent No.: US 8,864,031 B1
(45) Date of Patent: Oct. 21, 2014

(54) REMOTE MANAGEMENT OF A BARCODE READER

(75) Inventors: George Powell, Sandy, UT (US); Ryan Hoobler, Salt Lake City, UT (US); Mark Ashby, Taylorsville, UT (US)

(73) Assignee: The Code Corporation, Draper, UT (US)

( * ) Notice: Subject to any disclaimer, the term of this patent is extended or adjusted under 35 U.S.C. 154(b) by 399 days.

(21) Appl. No.: 13/339,701

(22) Filed: Dec. 29, 2011

(51) Int. Cl.
*G06K 19/00* (2006.01)

(52) U.S. Cl.
USPC ....... 235/462.01; 235/435; 235/439; 235/451

(58) Field of Classification Search
USPC .......................................................... 235/462
See application file for complete search history.

(56) References Cited

U.S. PATENT DOCUMENTS

2007/0063050 A1* 3/2007 Attia et al. ............... 235/462.46

OTHER PUBLICATIONS http://codecorp.com/assets/data_sheet/051210-5937-C004996-01-CodeXML-Modems.pdf (accessed Dec. 29, 2011).
http://www.soti.net/mc/MC1.html (accessed Dec. 29, 2011).

* cited by examiner

*Primary Examiner* — Matthew Mikels
(74) *Attorney, Agent, or Firm* — Timothy P. O'Hagan; Austin Rapp & Hardman

(57) ABSTRACT

A computer includes an application that expects to receive data via a unidirectional communication interface. The computer also includes a background service having a first thread and a second thread. The computer additionally includes device management client software. A barcode reader scans one or more barcodes to generate scanned data. The scanned data is sent to the computer via the unidirectional interface. The first thread of the background service reads the scanned data from the unidirectional interface and sends the scanned data to the application. The second thread of the background service enables the device management client software to perform management operations on the barcode reader via a bidirectional communication interface.

12 Claims, 7 Drawing Sheets

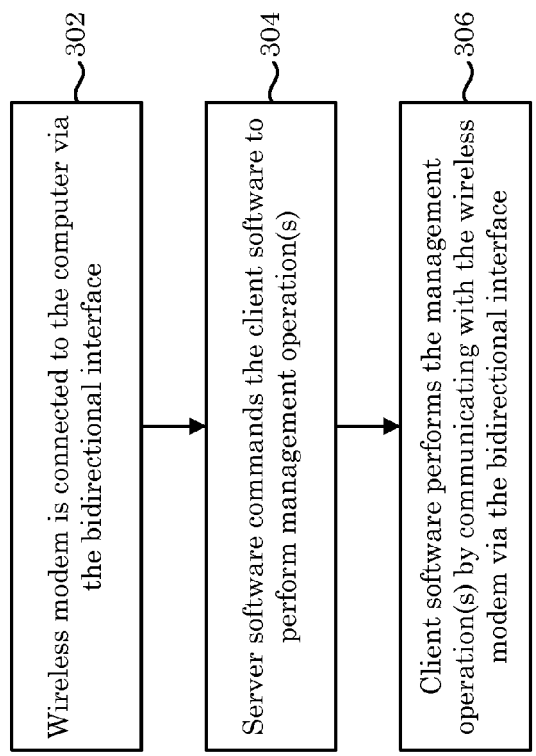
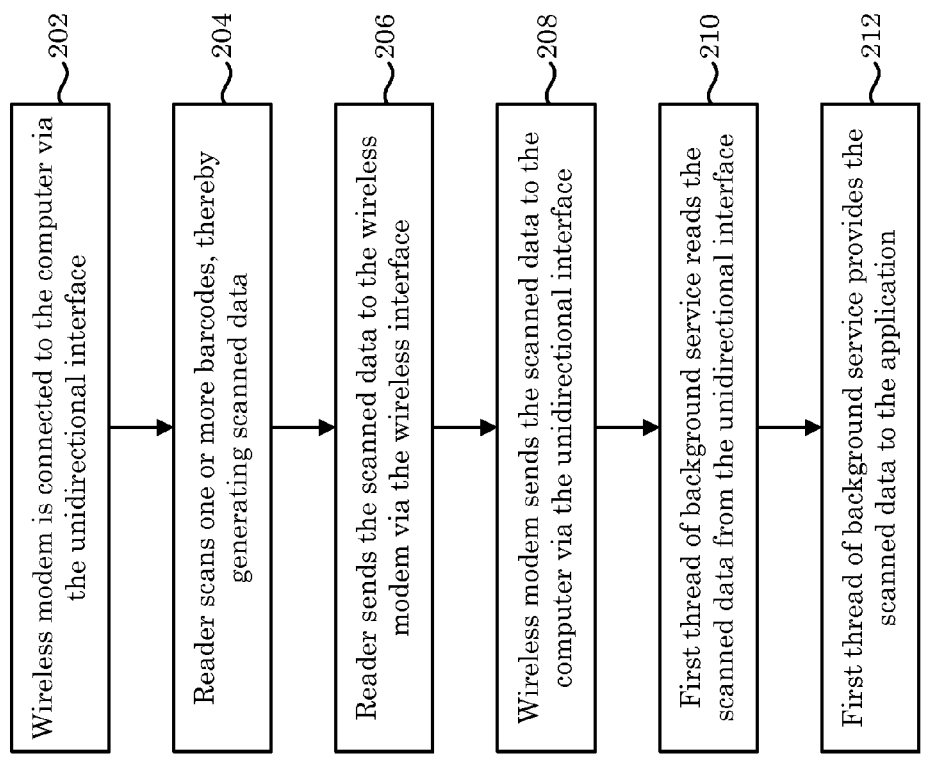

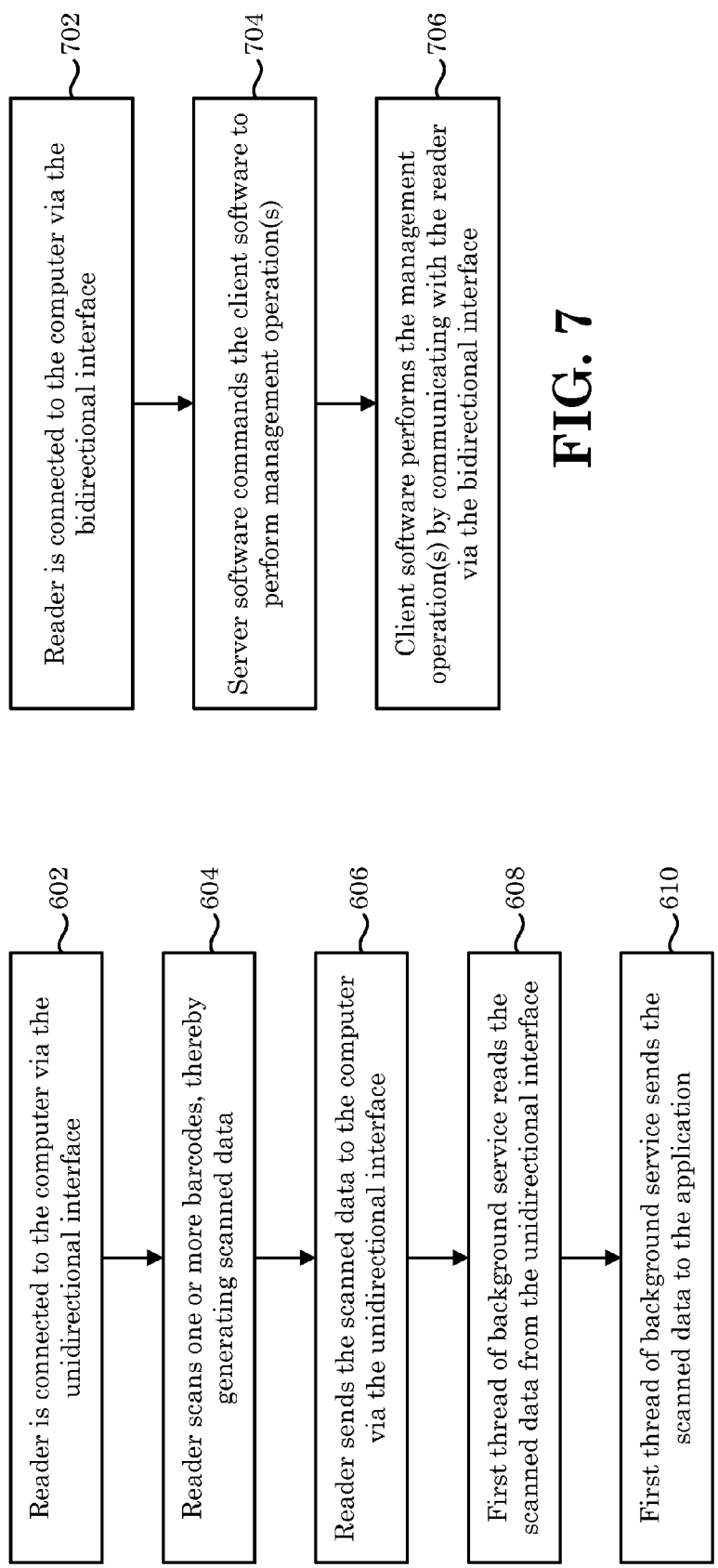

REMOTE MANAGEMENT OF A BARCODE READER

TECHNICAL FIELD

The present disclosure relates generally to barcodes and barcode readers.

BACKGROUND

A barcode is an optical machine-readable representation of data. Originally, barcodes represented data by varying the widths and spacings of parallel lines. These types of barcodes may be referred to as linear or one-dimensional (1D) barcodes. Later, barcodes evolved into rectangles, dots, hexagons and other geometric patterns in two dimensions (2D). Although 2D systems use a variety of symbols, they are generally referred to as barcodes as well. Devices for identifying or extracting information from barcodes are generally referred to as barcode readers.

Barcodes and barcode readers have a wide variety of uses. For example, almost every item from a grocery store, department store, or a mass merchandiser has a barcode on it. In addition, barcodes are widely used in the healthcare and hospital settings for patient identification, medication management, etc. Barcodes are used to keep track of rental cars, airline luggage, registered mail, express mail and parcels, etc. Barcoded tickets allow the holder to enter sports arenas, cinemas, theatres, fairgrounds, etc.

BRIEF DESCRIPTION OF THE DRAWINGS

FIG. 2 illustrates an example showing how the reader may be used to input data to the application in the system of FIG. 1.

FIG. 3 illustrates an example showing how management operations may be performed with respect to the reader in the system of FIG. 1.

FIG. 6 illustrates an example showing how the reader may be used to input data to the application in the system of FIG. 5.

FIG. 7 illustrates an example showing how management operations may be performed with respect to the reader in the system of FIG. 5.

DETAILED DESCRIPTION

By connecting a barcode reader to a computer, the reader may be used to input data to an application that is running on the computer. The application may expect to receive input via a keyboard interface. Therefore, the reader may be connected to the computer via a keyboard interface, and the reader's output may be provided to the application via the keyboard interface.

From time to time, it may be desirable to perform management operations on the reader. Examples of management operations that may be performed on a reader include downloading a configuration file (e.g., a firmware upgrade, a JavaScript file, etc.) to the reader, receiving a configuration file uploaded from the reader, obtaining status information (e.g., battery status, general health, read performance, statistics, troubleshooting information, location information, digital images, etc.) from the reader, etc.

The following is an example of a conventional approach for performing management operations on a reader. An information technology (IT) administrator may travel to wherever the reader is located in order to perform the desired management operations. The reader may already be connected to a computer, e.g., for purposes of inputting data to an application that runs on that computer. However, if the reader is connected via a keyboard interface, as is typically the case, it may be difficult to perform the desired management operations on the reader. Another potential problem is that the computer to which the reader is connected may not have the necessary software for performing the desired management operations.

To address these problems, the IT administrator may disconnect the reader from the computer and connect the reader to another computer that has the appropriate management software running on it. This other computer may be, for example, a laptop that the IT administrator takes with him/her to the location of the reader. Once the management operations have been performed, the administrator may disconnect the reader from the IT administrator's computer and reconnect the reader to the original computer via the keyboard interface.

Figure 1:
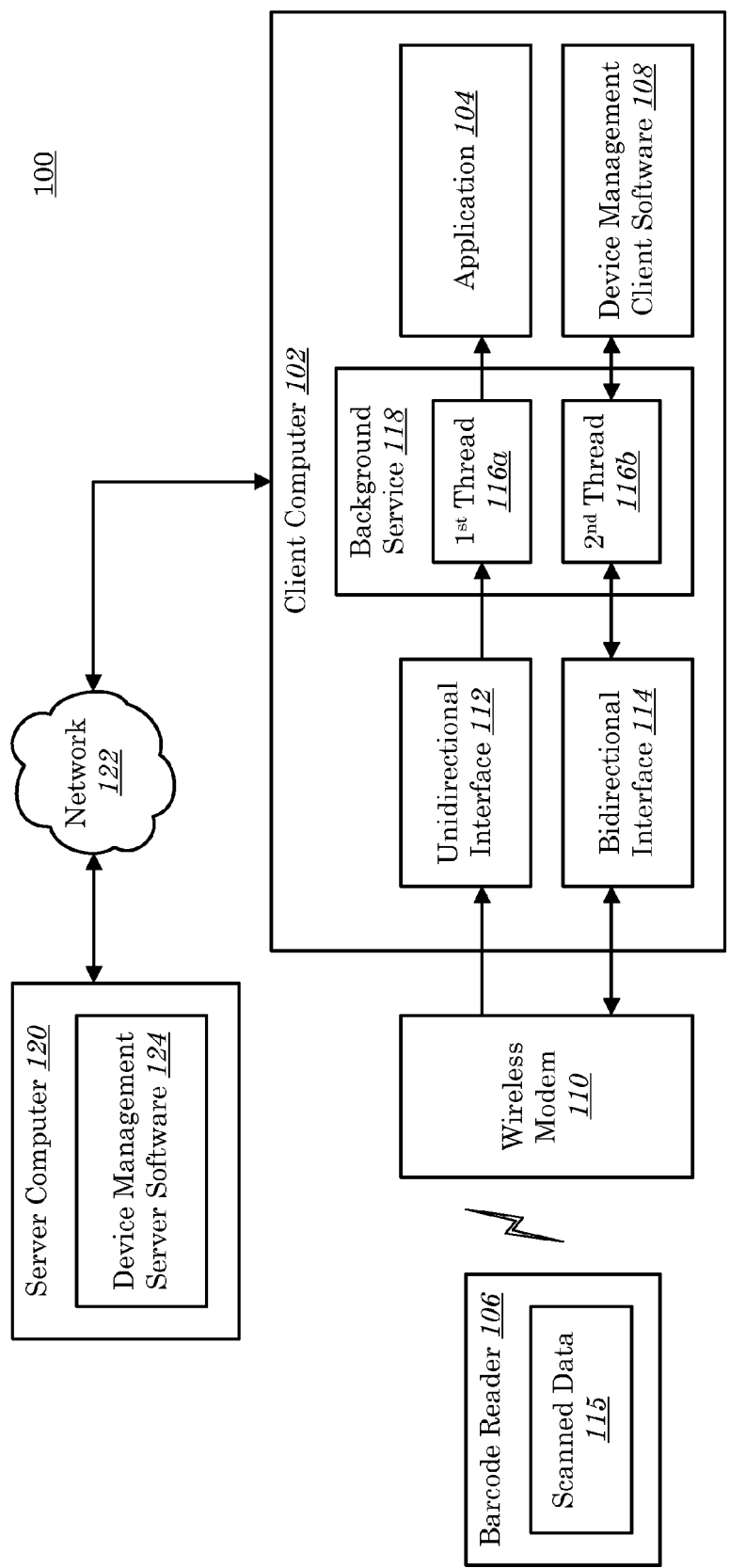
FIG. 1 illustrates a system in accordance with an embodiment of the invention.

The present disclosure relates generally to improved systems and methods for performing management operations on a reader. FIG. 1 illustrates a system 100 in accordance with an embodiment of the invention. The system 100 includes a client computer 102. As used herein, the term "computer" should be interpreted broadly to include any device that includes a digital processor and that is capable of processing information to produce a desired result. For example, the client computer 102 may be a desktop computer, a laptop or notebook computer, a tablet computer, a smartphone, a portable data terminal, a personal digital assistant, etc.

The computer 102 includes an application 104 that expects to receive input via a unidirectional communication interface 112. As used herein, the term "unidirectional communication interface" refers to a communication interface that is used primarily in a single direction. For example, the unidirectional interface 112 may be a keyboard interface, a mouse interface, a touchpad interface, etc.

The system 100 also includes a barcode reader 106. The reader 106 may be used to scan one or more barcodes (which may be 1D and/or 2D barcodes), thereby generating scanned data 115.

The client computer 102 is connected to a server computer 120 via a network 122. Device management server software 124 runs on the server computer 120, and device management client software 108 runs on the client computer 102. The server software 124 and the client software 108 work together to perform management operations with respect to the reader 106.

The server software 124 may be a MobiControl Deployment Server, and the client software 108 may be a MobiControl Device Agent. Both the MobiControl Deployment Server and the MobiControl Device Agent are developed by SOTI Inc. and are commercially available.

The reader 106 may be connected to a wireless modem 110 via a wireless interface, which may be a Bluetooth® interface. The wireless modem 110 can be connected to the client computer 102 via the unidirectional interface 112 or via a bidirectional communication interface 114. As used herein, the term "bidirectional communication interface" refers to a communication interface that facilitates two-way communication. For example, the bidirectional interface 114 may be a USB human interface device (HID) interface. The wireless modem 110 may be the CodeXML Bluetooth® Modem, sold commercially by The Code Corporation.

A background service 118 runs on the client computer 102. The background service 118 includes a first thread 116a and a second thread 116b. The first thread 116a of the background service 118 reads data from the unidirectional interface 112 and provides it to the application 104. The second thread 116b of the background service 118 enables the client software 108 to perform management operations on the reader 106, by facilitating bidirectional communication between the client software 108 and the wireless modem 110 via the bidirectional interface 114.

An example showing how the reader 106 may be used to input data to the application 104 will be described with reference to FIGS. 1 and 2. In this example, the wireless modem 110 is connected 202 to the computer 102 via the unidirectional interface 112. The reader 106 scans 204 one or more barcodes, thereby generating scanned data 115. The reader 106 sends 206 the scanned data 115 to the wireless modem 110 via a wireless interface. The wireless modem 110 sends 208 the scanned data 115 to the computer 102 via the unidirectional interface 112. The first thread 116a of the background service 118 reads 210 the scanned data 115 from the unidirectional interface 112, and provides 212 the scanned data 115 to the application 104.

An example showing how management operations may be performed with respect to the reader 106 will be described with reference to FIGS. 1 and 3. In this example, the wireless modem 110 is connected 302 to the computer 102 via the bidirectional interface 114. If the wireless modem 110 is initially connected to the computer 102 via the unidirectional interface 112, the wireless modem 110 may be commanded to switch to being connected via the bidirectional interface 114. This command may come from the client software 108, from the reader 106, etc.

The server software 124 commands 304 the client software 108 to perform one or more management operations with respect to the reader 106. Some examples of management operations were described previously. In response, the client software 108 performs 306 the desired management operations by communicating with the wireless modem 110 (which communicates with the reader 106) via the bidirectional interface 114. The second thread 116b of the background service 118 facilitates bidirectional communication between the client software 108 and the wireless modem 110 via the bidirectional interface 114.

When the management operations have been performed, the wireless modem 110 may be commanded to return to being connected via the unidirectional interface 112. Such a command may come from the client software 108, from the reader 106, etc. Alternatively, the wireless modem 110 may remain connected via the bidirectional interface 114 for an indefinite period of time, until the user determines that there is a need to switch back to being connected via the unidirectional interface 112.

There are several ways in which the depicted system 100 simplifies the process of performing management operations on a barcode reader 106 compared to the conventional approach described previously. As noted above, with the conventional approach, it may be necessary to disconnect the reader from one computer, and to connect the reader to a separate computer that has the appropriate management software on it. However, in the depicted system 100, this is not necessary.

In addition, in the depicted system 100, it is not necessary for an IT administrator to travel to wherever the reader 106 is located in order to perform desired management operations. Instead, an IT administrator may remotely perform management operations on the reader 106 from the server computer 120, by using the server software 124.

Figure 4:
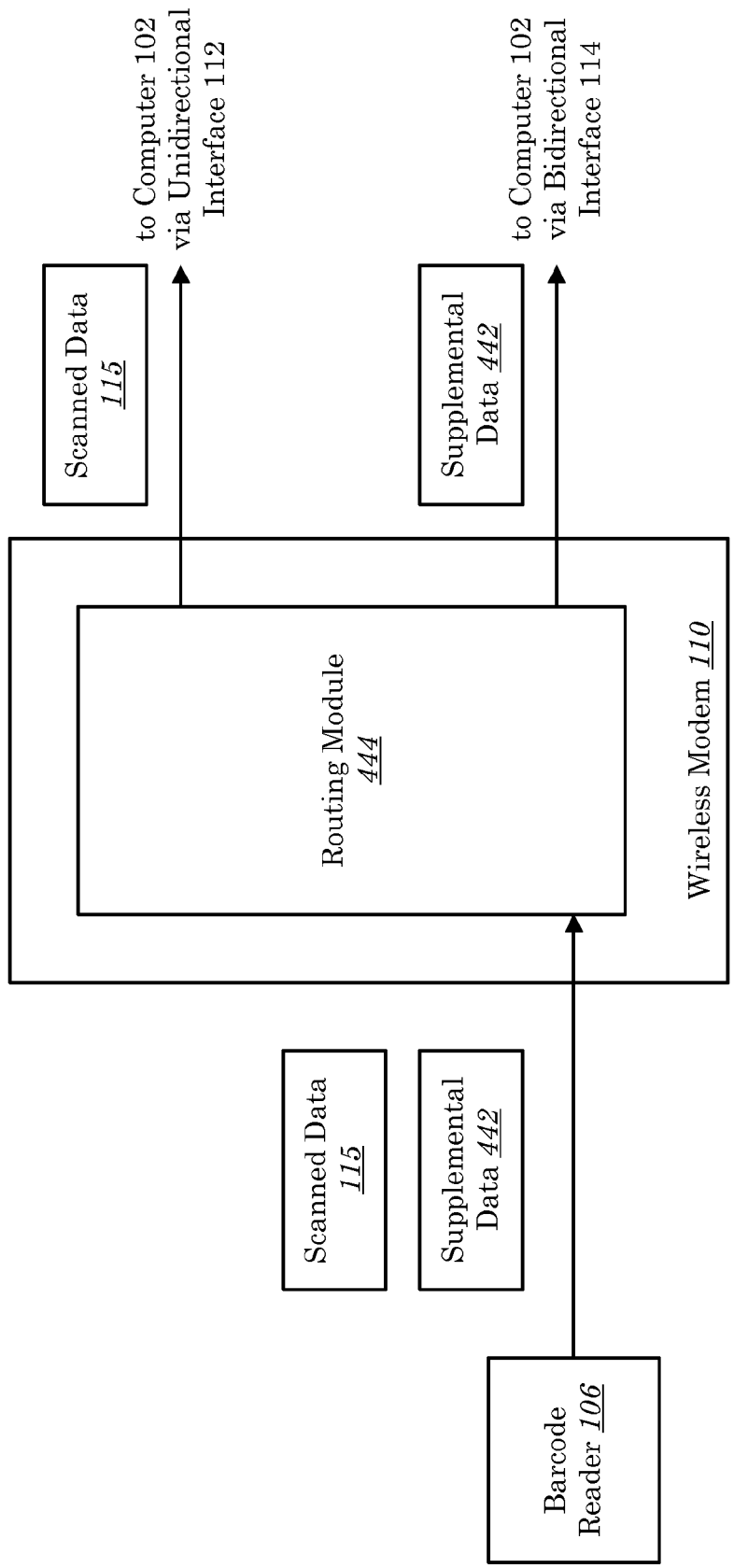
FIG. 4 illustrates certain aspects of one implementation of the wireless modem in the system of FIG. 1.

In addition to simplifying the process of performing management operations, the depicted system 100 may also provide routing functionality that may be beneficial in some situations. An example of this routing functionality will be described in connection with FIG. 4.

In the depicted example, the reader 106 outputs supplemental data 442 in addition to the scanned data 115. The supplemental data 442 may include information about the scanned data 115. For example, the supplemental data 442 may include a date stamp and/or a timestamp indicating when the scanned data 115 was generated, a user identifier corresponding to the person who was using the reader 106 when the scanned data 115 was generated, an indication that the scanned data 115 was scanned from a barcode rather than being generated via another interface (such as a keypad on the reader 106), a command to launch a secondary application, etc.

The scanned data 115 and the supplemental data 442 may be sent to the wireless modem 110 via a wireless interface. A routing module 444 on the wireless modem 110 may send the scanned data 115 and the supplemental data 442 to different destinations. For example, the routing module 444 may send the scanned data 115 to the computer 102 via the unidirectional interface 112, where it may be read by the first thread 116a of the background service 118 and provided to the application 104. Conversely, the routing module 444 may send the supplemental data 442 to the computer 102 via the bidirectional interface 114, where it may be read by the second thread 116b of the background service 118 and provided to the client software 108 (and possibly to the server software 124 and/or to another destination).

In another example, the routing module 444 may use the supplemental data 442 to determine where the scanned data 115 is sent. For example, suppose that there are different types of barcodes that are being scanned. The supplemental data 442 may indicate which type of barcode has been scanned. The data from a first type of barcode may be sent to one destination, whereas the data from a second type of barcode may be sent to a different destination.

Figure 5:
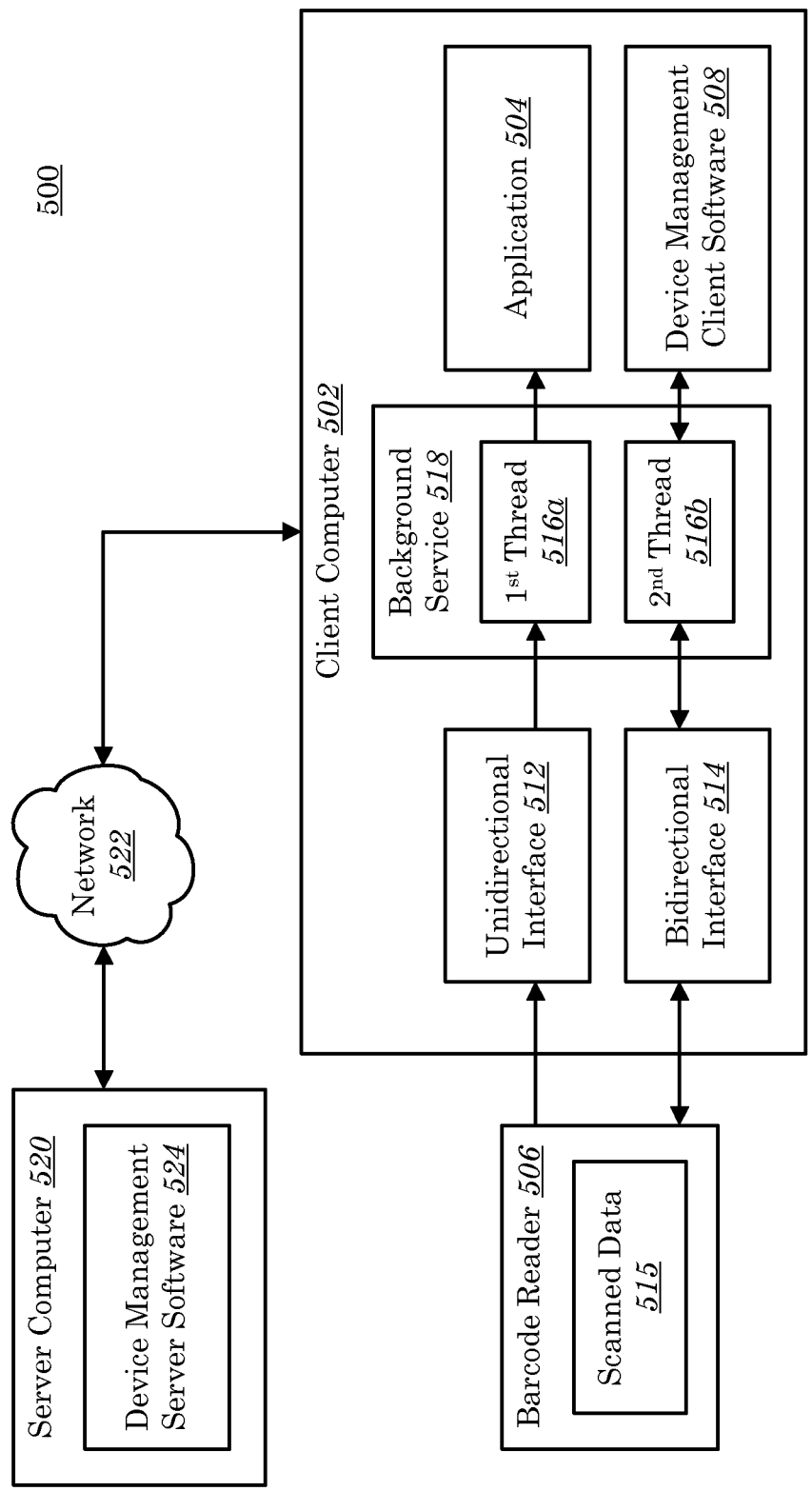
FIG. 5 illustrates a system in accordance with another embodiment of the invention.

FIG. 5 illustrates a system 500 in accordance with another embodiment of the invention. The system 500 is similar to the system 100 shown in FIG. 1. However, the depicted system 500 does not include a wireless modem. Instead, the reader 506 itself is connected to the client computer 502 via a unidirectional interface 512 or via a bidirectional interface 514.

An example showing how the reader 506 may be used to input data to the application 504 will be described with reference to FIGS. 5 and 6. In this example, the reader 506 is connected 602 to the computer 502 via the unidirectional interface 512. The reader 506 scans 604 one or more barcodes, thereby generating scanned data 515. The reader 506 sends 606 the scanned data 515 to the computer 502 via the unidirectional interface 512. The first thread 516a of the background service 518 reads 608 the scanned data 515 from the unidirectional interface 512, and sends 610 the scanned data 515 to the application 504.

An example showing how management operations may be performed on the reader 506 will be described with reference to FIGS. 5 and 7. In this example, the reader 506 is connected 702 to the computer 502 via the bidirectional interface 514. The server software 524 commands 704 the client software 508 to perform one or more management operations with respect to the reader 506. Some examples of management operations were described previously. In response, the client software 508 performs 706 the desired management operations by communicating with the reader 506 via the bidirectional interface 514. The second thread 516b of the background service 518 facilitates bidirectional communication between the client software 508 and the reader 506 via the bidirectional interface 514.

Figure 8:
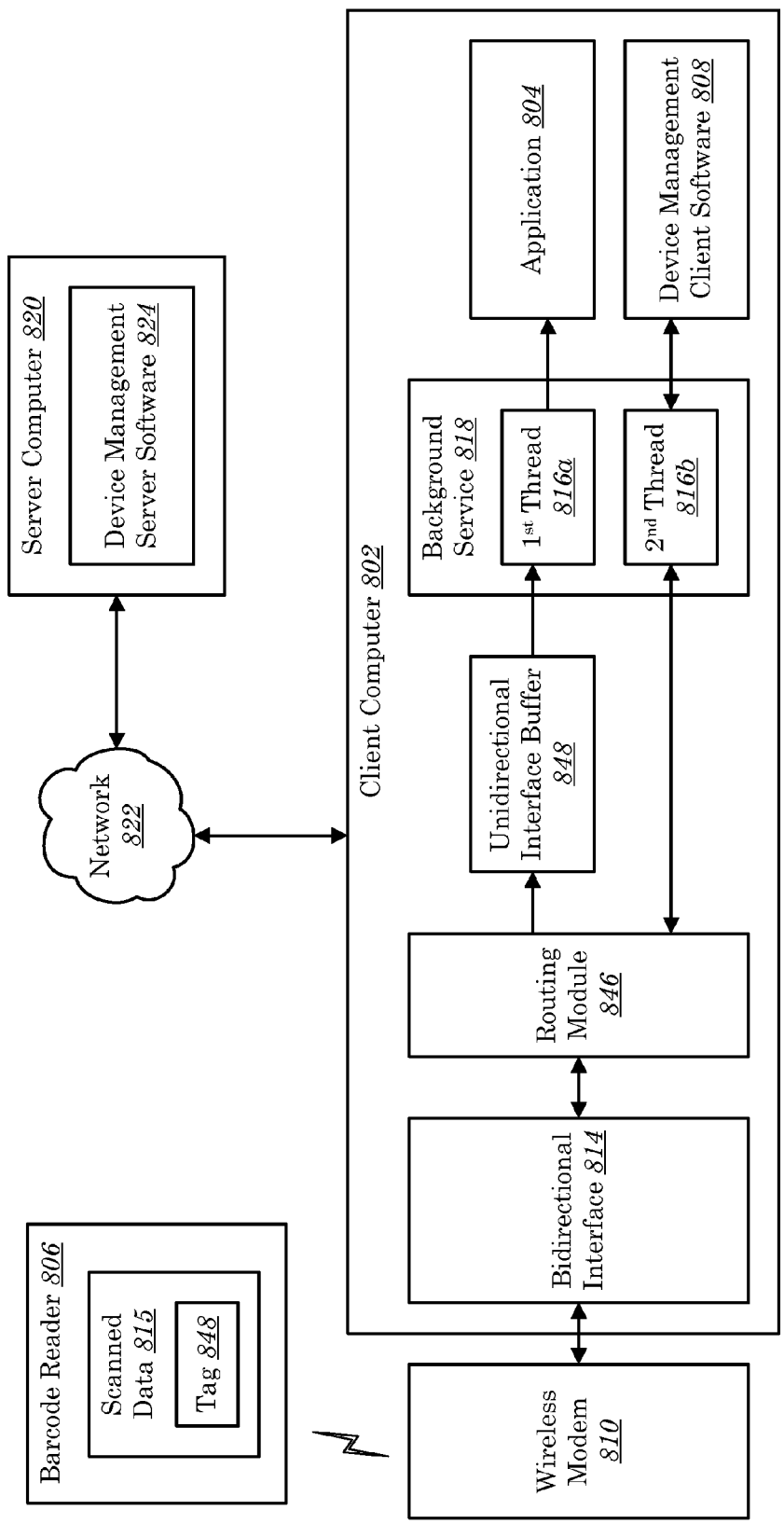
FIG. 8 illustrates a system in accordance with another embodiment of the invention.

FIG. 8 illustrates a system 800 in accordance with another embodiment of the invention. The system 800 is similar in many respects to the system 100 shown in FIG. 1. However, in the system 800 shown in FIG. 8, the wireless modem 810 connects to the computer 802 via the bidirectional interface 814 only. Also, in the system 800 shown in FIG. 8, the computer 802 includes a routing module 846. The routing module 846 reads the bidirectional interface 814, identifies data that is destined for the application 804, and sends such data to a unidirectional interface buffer 848.

Figure 9:
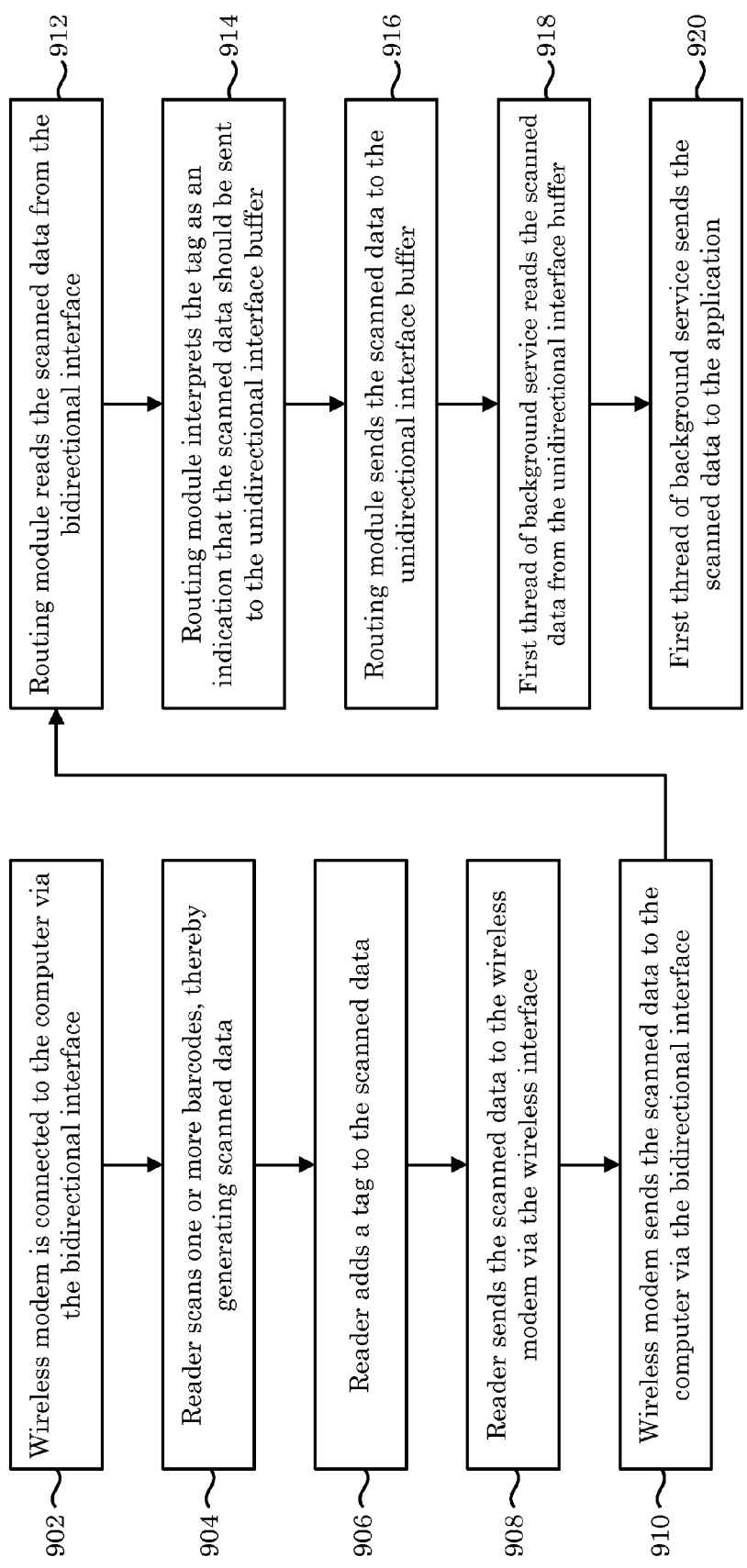
FIG. 9 illustrates an example showing how the reader may be used to input data to the application in the system of FIG. 8.

An example showing how the reader 806 may be used to input data to the application 804 will be described with reference to FIGS. 8 and 9. In this example, the wireless modem 810 is connected 902 to the computer 802 via the bidirectional interface 814. The reader 806 scans 904 one or more barcodes, thereby generating scanned data 815. The reader 806 adds 906 a tag 848 to the scanned data 815. The tag 848 will be used as a signal to the routing module 846 that the scanned data 815 is destined for the application 804. The reader 806 sends 908 the scanned data 815, including the tag 848, to the wireless modem 810 via the wireless interface. The wireless modem 810 sends 910 the scanned data 815, including the tag 848, to the computer 802 via the bidirectional interface 814.

The routing module 846 reads 912 the scanned data 815 from the bidirectional interface 814. The routing module 846 interprets 914 the tag 848 as an indication that the scanned data 815 should be sent to a unidirectional interface buffer 848. Therefore, the routing module 846 sends 916 the scanned data 815 to the unidirectional interface buffer 848. Then, the first thread 816a of the background service 818 reads 918 the scanned data 815 from the unidirectional interface buffer 848 and sends 920 the scanned data 815 to the application 804.

Management operations may be performed on the reader 806 in a manner similar to the way in which management operations may be performed on the reader 106 in the system 100 of FIG. 1. In particular, the client software 808 may perform the management operations in response to commands from the server software 824, and the client software 808 may communicate with the wireless modem 810 (which communicates with the reader 806) via the bidirectional interface 814.

The system 800 may be modified by eliminating the wireless modem 810 and connecting the reader 806 to the computer 802 via the bidirectional interface 814. With this modification, the example shown in FIG. 9 would change slightly in that the reader 806 would send the scanned data 815 to the computer 802 via the bidirectional interface 814 (instead of sending the scanned data 815 to the wireless modem 810 via the wireless interface, and having the wireless modem 810 send the scanned data 815 to the computer 802 via the bidirectional interface 814). Also, to perform management operations on the reader 806, the client software 808 may communicate with the reader 806 via the bidirectional interface 814 (instead of communicating with the wireless modem 810 and having the wireless modem 810 communicate with the reader 806).

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A system, comprising:
   a computer comprising an application, device management client software, a communication interface comprising a unidirectional logical interface and a bidirectional logical interface, and a background service; and
   a barcode reader that scans one or more barcodes to generate scanned data;
   wherein:
   the barcode reader is in communication with the computer by way of the communication interface;
   the application on the computer expects to receive data from the barcode reader via the unidirectional logical interface;
   a first thread of the background service reads the scanned data from the bidirectional logical interface and sends the scanned data to the application; and
   a second thread of the background service enables the device management client software to modify configuration parameters that control operation of the barcode reader via the bidirectional logical interface.

2. The system of claim 1, further comprising a wireless modem, wherein:
   the wireless modem is connected to the client computer via the bidirectional logical interface; and
   the barcode reader is connected to the wireless modem via a wireless interface.

3. The system of claim 2, wherein:
   the wireless modem is connected to the client computer via the communication interface;
   the barcode reader sends the scanned data to the wireless modem via the wireless interface; and
   the wireless modem sends the scanned data to the client computer via the unidirectional communication interface.

4. The system of claim 2, wherein:
   the wireless modem is connected to the client computer via the communication interface; and
   the second thread of the background service facilitates bidirectional communication between the device management client software and the wireless modem via the bidirectional logical interface.

5. The system of claim 2, wherein:
   the wireless modem comprises a routing module;
   the routing module receives the scanned data and supplemental data from the barcode reader; and
   the routing module sends the scanned data and the supplemental data to different destinations.

6. The system of claim 2, wherein:
   the wireless modem comprises a routing module;
   the routing module receives the scanned data and supplemental data from the barcode reader; and
   the routing module uses the supplemental data to determine where to send the scanned data.

7. The system of claim 1, wherein the application reads the scanned data from the unidirectional logical interface when the background service is not operating on the computer.

8. The system of claim 7, wherein:
the barcode reader is connected to the client computer via the communication interface; and
the second thread of the background service facilitates bidirectional communication between the device management client software and the barcode reader via the bidirectional logical interface.

9. The system of claim 1, wherein:
the computer further comprises a routing module;
the routing module reads the scanned data from the bidirectional logical interface;
the scanned data comprises a tag; and
the routing module sends the scanned data to a unidirectional interface buffer in response to detecting the tag.

10. The system of claim 9, further comprising a wireless modem, wherein:
the barcode reader is connected to the wireless modem via a wireless interface;
the wireless modem is connected to the client computer via the communication interface;
the barcode reader sends the scanned data to the wireless modem via the wireless interface; and
the wireless modem sends the scanned data to the client computer via the communication interface.

11. The system of claim 9, wherein:
the barcode reader is connected to the client computer via the communication interface; and
the barcode reader sends the scanned data to the client computer via the communication interface.

12. The system of claim 1, further comprising a server computer comprising device management server software, wherein:
the computer is connected to the server computer via a network; and
the device management client software modifies the configuration parameters that control the operation of the barcode reader in response to commands from the device management server software.

* * * * *